United States Patent
Xia et al.

(10) Patent No.: US 9,391,546 B2
(45) Date of Patent: Jul. 12, 2016

(54) DIRECT TORQUE CONTROL METHOD FOR INHIBITING TORQUE RIPPLES

(71) Applicant: Tianjin University, Tianjin (CN)

(72) Inventors: Changliang Xia, Tianjin (CN); Jiaxin Zhao, Tianjin (CN); Yan Yan, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 14/649,210

(22) PCT Filed: Dec. 24, 2012

(86) PCT No.: PCT/CN2012/087251
§ 371 (c)(1),
(2) Date: Jun. 3, 2015

(87) PCT Pub. No.: WO2014/094319
PCT Pub. Date: Jun. 26, 2014

(65) Prior Publication Data
US 2015/0318807 A1   Nov. 5, 2015

(30) Foreign Application Priority Data
Dec. 19, 2012  (CN) .......................... 2012 1 0555691

(51) Int. Cl.
*H02P 21/00* (2016.01)
*H02P 6/10* (2006.01)

(52) U.S. Cl.
CPC ...................................... *H02P 6/10* (2013.01)

(58) Field of Classification Search
CPC ..... H02P 27/04; H02P 21/0035; H02P 21/06; H02P 21/146
USPC ............. 318/400.01, 400.02, 400.14, 400.15, 318/700, 400.12, 400.23, 400.24, 400.25, 318/701, 725, 727, 779, 800, 801, 430, 318/432; 363/34, 40, 46, 55, 95
See application file for complete search history.

(56) References Cited

U.S. PATENT DOCUMENTS 7,436,147 B2 * 10/2008 Sato .................... H02P 27/16
318/432
7,881,087 B2 * 2/2011 Sakakibara ........... H02M 5/275
363/159

FOREIGN PATENT DOCUMENTS

CN        101056084 A      10/2007
CN        101442289 A       5/2009
(Continued)

OTHER PUBLICATIONS

Wang Bing et al., Strategy to decrease torque ripple in asynchronous motor direct torque control, <Modular Machine Tool & Automatic Manufacturing Technique>, 2009, p. 66-68, No. 12.

(Continued)

*Primary Examiner* — Antony M Paul
(74) *Attorney, Agent, or Firm* — George G. Wang; Bei & Ocean (57) ABSTRACT

The present invention relates to a direct torque control method for inhibiting torque ripples, mainly comprising the following steps: establishing an MC voltage vector switching table visually displaying degrees of change in torque and flux, and, proposing, on the basis of the MC voltage vector switching table visually displaying the degrees of change in torque and flux, an MC-DTC mark-to-space ratio computing policy for torque quantification control. The MC-DTC mark-to-space ratio computing policy allows for inhibition of torque ripples of a PMSM speed control system and for a constant switching frequency, uses the MC voltage vector switching table visually displaying the degrees of change in torque and flux, has a simple algorithm, does not reply on motor parameters, and obviates the need for rotational coordinate transformation.

1 Claim, 6 Drawing Sheets

(56) References Cited

FOREIGN PATENT DOCUMENTS

| | | |
|---|---|---|
| CN | 101931362 A | 12/2010 |
| CN | 102035456 A | 4/2011 |
| CN | 102710188 A | 10/2012 |
| CN | 102790566 A | 11/2012 |
| EP | 2164165 A1 | 3/2010 |
| JP | H0833399 A | 2/1996 |
| JP | H11235099 A | 8/1999 |
| KR | 20030012363 A | 2/2003 |

OTHER PUBLICATIONS

Carlos Ortega etc., Improved Waveform Quality in the Direct Torque Control of Matrix-Converter-Fed PMSM Drives, <IEEE Transactions on Industrial Electronics>, Jun. 2010, p. 2101-2110, vol. 57, No. 6.

* cited by examiner

| $C_T$ | $C_\phi$ | $l_\theta$ | | | | | |
|---|---|---|---|---|---|---|---|
| | | 1, 2 | 3, 4 | 5, 6 | 7, 8 | 9, 10 | 11, 12 |
| +1 | +1 | $V_2$ | $V_3$ | $V_4$ | $V_5$ | $V_6$ | $V_1$ |
| | 0 | $V_7$ | $V_0$ | $V_7$ | $V_0$ | $V_7$ | $V_0$ |
| | −1 | $V_6$ | $V_1$ | $V_2$ | $V_3$ | $V_4$ | $V_5$ |
| −1 | +1 | $V_3$ | $V_4$ | $V_5$ | $V_6$ | $V_1$ | $V_2$ |
| | 0 | $V_0$ | $V_7$ | $V_0$ | $V_7$ | $V_0$ | $V_7$ |
| | −1 | $V_5$ | $V_6$ | $V_1$ | $V_2$ | $V_3$ | $V_4$ |

Fig. 6

| $l_\alpha$ | $C_\phi$ | VSI Vector | | | | | |
|---|---|---|---|---|---|---|---|
| | | $V_1$ | $V_2$ | $V_3$ | $V_4$ | $V_5$ | $V_6$ |
| 1, 2 | +1 | $V_{-3}$ | $V_{+9}$ | $V_{-6}$ | $V_{+3}$ | $V_{-9}$ | $V_{+6}$ |
| | −1 | $V_{+1}$ | $V_{-7}$ | $V_{+4}$ | $V_{-1}$ | $V_{+7}$ | $V_{-4}$ |
| 3, 4 | +1 | $V_{+2}$ | $V_{-8}$ | $V_{+5}$ | $V_{-2}$ | $V_{+8}$ | $V_{-5}$ |
| | −1 | $V_{-3}$ | $V_{+9}$ | $V_{-6}$ | $V_{+3}$ | $V_{-9}$ | $V_{+6}$ |
| 5, 6 | +1 | $V_{-1}$ | $V_{+7}$ | $V_{-4}$ | $V_{+1}$ | $V_{-7}$ | $V_{+4}$ |
| | −1 | $V_{+2}$ | $V_{-8}$ | $V_{+5}$ | $V_{-2}$ | $V_{+8}$ | $V_{-5}$ |
| 7, 8 | +1 | $V_{+3}$ | $V_{-9}$ | $V_{+6}$ | $V_{-3}$ | $V_{+9}$ | $V_{-6}$ |
| | −1 | $V_{-1}$ | $V_{+7}$ | $V_{-4}$ | $V_{+1}$ | $V_{-7}$ | $V_{+4}$ |
| 9, 10 | +1 | $V_{-2}$ | $V_{+8}$ | $V_{-5}$ | $V_{+2}$ | $V_{-8}$ | $V_{+5}$ |
| | −1 | $V_{+3}$ | $V_{-9}$ | $V_{+6}$ | $V_{-3}$ | $V_{+9}$ | $V_{-6}$ |
| 11, 12 | +1 | $V_{+1}$ | $V_{-7}$ | $V_{+4}$ | $V_{-1}$ | $V_{+7}$ | $V_{-4}$ |
| | −1 | $V_{-2}$ | $V_{+8}$ | $V_{-5}$ | $V_{+2}$ | $V_{-8}$ | $V_{+5}$ |

DIRECT TORQUE CONTROL METHOD FOR INHIBITING TORQUE RIPPLES

FIELD OF THE INVENTION

The present invention belongs to the field of control of power converters for driving motors and particularly relates to a method for improving performance of a matrix converter-permanent magnet synchronous motor speed control system by using direct torque control.

BACKGROUND OF THE INVENTION

Dispensing with large-volume electric energy storage equipment and low pollution to the harmonic of the power grid, the Matrix Converter (MC) is an AC-AC electric power converter having a compact structure and a high power density. Recently, with the continuous improvement of the commutation technology, system stability, control modulation policies and other aspects, an MC-fed motor speed control system has been applied in many industrial fields such as elevator traction, wind power generation and machine manufacture.

The Direct Torque Control (DTC) was proposed in 1986 for controlling a Voltage Source Inverse (VSI)-fed induction motor speed control system (VSI-DTC) in early. Due to its advantages of simple structure, independence from motor parameters, no need for rotational coordinate transformation and the like, DTC has attracted much attention of scholars. As the MC control modulation technology gradually becomes mature, scholars in other countries than China have proposed a novel DTC in 2001 and applied the novel DTC in an MC-fed induction motor speed control system (MC-DTC). This method may not only directly control an electromagnetic torque and a stator flux on the motor side, but also control an input power factor angle on the grid side. However, as both the MC-DTC and the VSI-DTC employ a control structure using a hysteresis comparator and a voltage vector switching table and only one voltage vector is used within each control cycle, the motor system has two main defects, i.e., too large torque ripple and inconstant switching frequency. To solve those defects, many suitable improved DTCs for VSI have been proposed continuously. Subsequently, scholars worldwide optimize the improved DTC algorithms and utilize the improved DTC algorithms in the MC-fed motor speed control systems. The improvement of algorithm may be classified as below.

1. Multi-stage hysteresis and multi-vector subdivision are employed. For VSI, as it has only 6 effective voltage vectors constant in amplitude and direction, it is required to generate 56 virtual voltage vectors with unequal amplitude by discrete spatial vector modulation and subdivide and select the virtual vectors by a five-stage torque hysteresis comparator, thereby realizing the purpose of inhibiting torque ripples. For MC, as it is characterized by multiple vectors, i.e., 18 amplitude variable vectors distributed in 6 directions, the voltage vectors may be subdivided into large and small vectors according to the amplitude, and the voltage vectors are selected by a five-stage torque hysteresis comparator, thereby realizing the inhibition of the torque ripples. Studies have shown that, although such a method maintains the DTCs' advantages of simple structure, no need for motor parameters and rotational coordinate transformation and the like and has good inhibition effect on torque ripples, it has a defect of inconstant switching frequency.

2. The voltage vector switching table (DTC-SVM) is replaced by an SVM. In such a method, by taking torque and flux offsets as input, adopting a PI controller, a deadbeat controller, a sliding mode controller, a prediction controller and the like to acquire a reference voltage value of a motor stator, and utilizing the SVM to acquire an actual voltage vector according to the reference value. Some scholars apply this method to MC, where the MC is equivalent on a virtual rectifier side and a virtual inverter side, and the SVM is applied in part or all of the virtual rectifier and inverter sides to acquire an optimal input current or output voltage. As the SVM may generate continuously rotational voltage vectors in a complex plane, this method may accurately control the motor torque and flux. However, as the control structure thereof is more complicated than a conventional DTC, rotational coordinate transformation and large amount of calculation are often required.

3. Mark-to-space ratio optimization calculation is employed. In such a method, a conventional DTC switching table is employed to select a voltage vector and the mark-to-space ratio of this voltage vector is calculated by a torque optimization formula so that torque offset within one cycle is minimized. Such a method obviates the need for rotational coordinate transformation, may inhibit torque ripples well and has a constant switching frequency. However, a majority of optimization algorithms are complicated and highly depend on motor parameters.

Those three improved algorithms realize the purpose of inhibiting motor torque ripples at the cost of sacrificing some inherent advantages of the direct torque control. These algorithms, either they are complicated in calculation or depend on motor parameters or need for rotational coordinate transformation, can not improve their disadvantages on the basis of strengthening their advantages in control.

SUMMARY OF THE INVENTION

In view of the prior art, the present invention provides a direct torque control method for inhibiting torque ripples, which may effectively inhibit torque ripples, acquire a constant switching frequency and maintain the DTCs' advantages of no need for rotational coordinate transformation, independence from motor parameters, simple algorithm and high robustness. The present invention establishes an MC voltage vector switching table visually displaying the degrees of change in torque and flux.

To solve the above technical problems, the present invention provides a direct torque control method for inhibiting torque ripples, including the following steps:

step 1: establishing an MC voltage vector switching table visually displaying degrees of change in torque and flux a spatially rotational coordinate system x-y is established and a stator flux $\psi_s$ is positioned on the x-axis, with a relationship between the torque and stator flux amplitude of a permanent magnet synchronous motor and a stator voltage as follows:

$$\frac{d}{dt}|\Psi_s| = v_x \quad (1)$$

$$\frac{d}{dt}T_e \propto v_y - \omega_r |\Psi_s| \quad (2)$$

in formulae (1) and (2), $v_x$ and $v_y$ denote components of the stator voltage on the x-axis and the y-axis, $\omega_r$ denotes an electrical angular speed of a rotor; $|\psi_s|$ denotes the stator flux amplitude, $T_e$ denotes the electromagnetic torque, and t denotes the time;

a voltage vector $V_{+1}$ of a+1 switching combination is decomposed on the x-y coordinates to obtain:

$$V_{+1y}=2/3v_{ab}\sin(-\theta_s)=-2\sqrt{3}V_m\cos(\alpha_i+\pi/6)\sin\theta_s \quad (3)$$

$$V_{+1x}=2/3v_{ab}\cos(-\theta_s)=2\sqrt{3}V_m\cos(\alpha_i+\pi/6)\cos\theta_s \quad (4)$$

in formulae (3) and (4), $V_{+1x}$ denotes a projection of $V_{+1}$ on the x-axis, $V_{+1y}$ denotes a projection of $V_{+1}$ on the y-axis, $V_m$ denotes the maximum value of an MC input phase voltage, $\theta_s$ denotes an included angle between the x-axis and an A phase winding of a motor, and $\alpha_i$ denotes a vector angle of the MC input phase voltage;

a torque evaluation function $\tau$, a flux evaluation function $\lambda$ and a counter electromagnetic force evaluation function $\theta$ are defined as below:

$$\tau = \frac{v_y}{2/\sqrt{3}\,V_m} \quad (5)$$

$$\lambda = \frac{v_x}{2/\sqrt{3}\,V_m} \quad (6)$$

$$e = \frac{\omega_r|\Psi_s|}{2/\sqrt{3}\,V_m} \quad (7)$$

formula (3) and formula (4) are substituted into formula (5) and formula (6) respectively, to obtain torque and flux evaluation functions $\tau_{+1}$ and $\lambda_{+1}$ of the +1 switching combination:

$$\tau_{+1}=\cos(\alpha_i+\pi/6)\sin\theta_s \quad (8)$$

$$\lambda_{+1}=\cos(\alpha_i+\pi/6)\cos\theta_s \quad (9)$$

similarly, torque and flux evaluation functions of all voltage vectors of the MC are obtained;

both the torque evaluation function $\tau$ and the flux evaluation function $\lambda$ are binary periodic functions; within one of $\theta_s \in [0,2\pi]$ and $\alpha_i \in [0,2\pi]$, $\theta_s$ and $\alpha_i$ are divided into intervals every $\pi/6$ from 0 and then represented as a stator flux sector $I_\theta \in [1,12]$ and a stator voltage sector $I_\theta \in [1,12]$, so that the whole plane is divided into 12×12 regions;

the average value of each of the regions is used to represent the value of the torque evaluation function $\tau$ and the value of the flux evaluation function $\lambda$ of this region, and thus functions for calculating the average value of the torque evaluation function $\tau$ and the average value of the flux evaluation function $\lambda$ are defined as:

$$p_\tau = \text{round}\left[\frac{k}{(\pi/6)^2}\int_{\frac{\pi}{6}(I_\alpha-1)}^{\frac{\pi}{6}I_\alpha}\int_{\frac{\pi}{6}(I_\theta-1)}^{\frac{\pi}{6}I_\theta}\tau\,d\theta_s\,d\alpha_i\right] \quad (10)$$

$$p_\lambda = \text{round}\left[\frac{k}{(\pi/6)^2}\int_{\frac{\pi}{6}(I_\alpha-1)}^{\frac{\pi}{6}I_\alpha}\int_{\frac{\pi}{6}(I_\theta-1)}^{\frac{\pi}{6}I_\theta}\lambda\,d\theta_s\,d\alpha_i\right] \quad (11)$$

in formulae (10) and (11), $I_\alpha = \{1, 2, 3 \ldots 12\}$; $I_\theta = \{1, 2, 3 \ldots 12\}$; and round( ) denotes proximity rounding function, $p_\tau$ denotes a torque evaluation value, and $p_\lambda$ denotes a flux evaluation value; if k=10, the torque evaluation value $p_\tau$ and the flux evaluation value $p_\lambda$ are integers between −9 and +9;

formula (5), formula (6) and formula (7) are substituted into formula (1) and formula (2) to obtain a function relational expression between the torque evaluation function $\tau$, the flux evaluation function $\lambda$, the counter electromagnetic force evaluation function e, and a rate of change in torque and a rate of change in flux of the motor:

$$\frac{d}{dt}T_e \propto \tau - e \quad (12)$$

$$\frac{d}{dt}|\Psi_s| \propto \lambda \quad (13)$$

from formula (10), formula (11), formula (12) and formula (13), a function relational expression between the MC torque evaluation value $p_\tau$, the MC flux evaluation value $p_\lambda$ and the rate of change in torque and the rate of change in flux of the motor may be obtained:

$$\frac{d}{dt}T_e \approx \overline{\frac{d}{dt}T_e} \propto p_\tau - p_e \quad (14)$$

$$\frac{d}{dt}|\Psi_s| \approx \overline{\frac{d}{dt}|\Psi_s|} \propto p_\lambda \quad (15)$$

in formulae (14) and (15), the left part of symbol $\propto$ denotes an average value of the rate of change in torque and the rate of change in flux of the motor within a region, wherein the average value of the counter electromagnetic force evaluation function is:

$$p_e = \text{round}(10e) \quad (16)$$

it can be seen from formula (14) and formula (15) that the torque evaluation value $p_\tau$ and flux evaluation value $p_\lambda$ after discretization and averaging are approximately in direct proportion to the rates of change in torque and flux of the motor;

the $p_\tau$ values of the vector $V_{+1}$ within all regions may be calculated by substituting formula (8) into formula (10), these values are gathered in form of a table to obtain a switching table showing the effect of the vector $V_{+1}$ to the change in torque, where a horizontal header of the switching table showing the effect of the vector $V_{+1}$ to the change in torque is a stator flux sector while a vertical header thereof is a stator voltage sector;

the torque evaluation function $\tau$ and the flux evaluation function $\lambda$ are products of the two functions, wherein the term containing $\alpha_i$ is related to time and called herein as a temporal expression, and the term containing $\theta_s$ is related to the stator flux and the spatial position of the voltage vector and called herein as a spatial expression;

the torque evaluation functions $\tau$ and flux evaluation functions $\lambda$ of 18 effective vectors of the MC have the following situations:

situation 1: $\tau$ and $\lambda$ of a same vector have a same temporal expression, and the spatial expression of $\lambda$ is $\pi/2$ lagged behind the spatial expression of $\tau$;

situation 2: $\tau_{+1}, \tau_{+2}$ and $\tau_{+3}$ have a same spatial expression, but each has a temporal expression $2\pi/3$ lagged behind another in this order;

situation 3: $\tau_{+1}, \tau_{+4}$ and $\tau_{+7}$ have a same temporal expression, but each has a spatial expression $2\pi/3$ lagged behind another in this order; and $\tau_{+2}, \tau_{+5}$ and $\tau_{+8}$ have a same temporal expression, but each has a spatial expression $2\pi/3$ lagged behind another in this order; and $\tau_{+3}, \tau_{+6}$ and $\tau_{+9}$ have a same temporal expression, but each has a spatial expression $2\pi/3$ lagged behind another in this order;

situation 4: the values of negative vectors $\tau_{-1}, \tau_{-2}$ to $\tau_{-9}$, $\lambda_{+1}, \lambda_{-2}$ to $\lambda_{-9}$ are negative numbers of the values of corresponding positive vectors $\tau_{+1}, \tau_{+2}$ to $\tau_{+9}, \lambda_{+1}, \lambda_{+2}$ to $\lambda_{-9}$;

according to situation 2 and situation 3, the vertical header, i.e., the stator voltage sector, and the horizontal header, i.e., the stator flux sector, of the switching table showing the effect of the vector $V_{+1}$ to the change in torque may be translated to obtain a switching table showing the effect of all positive vectors of the MC to the change in torque; then, according to situation 1, the horizontal header, i.e., the stator flux sector, of the switching table showing the effect of the vector $V_{+1}$ to the change in torque may be translated to obtain a switching table showing the effect of all positive vectors of the MC to the change in flux; finally, according to situation 4, $p_\tau$ and $p_\lambda$ values corresponding to all negative vectors of the MC are calculated; and after translating the vertical header, i.e., the stator voltage sector, and the horizontal header, i.e., the stator flux sector, an MC voltage vector switching table visually displaying degrees of change in torque and flux is formed; and step 2: inquiring the torque evaluation value $p_\tau$ from the MC voltage vector switching table visually displaying degrees of change in torque and flux, and optimization calculating the mark-to-space ratio of the voltage vector according to a conventional MC-DTC control method, a voltage vector of a matrix converter is selected from the MC voltage vector switching table; the number of a sector of the stator flux vector is calculated; the number of a sector of the input voltage vector is calculated; the torque evaluation value $p_\tau$ of the MC vector is obtained through the MC voltage vector switching table visually displaying degrees of change in torque and flux; a counter electromagnetic force evaluation value $p_e$ is calculated; a torque coefficient is set offline; and, the flux torque evaluation value $p_\tau$, the counter electromagnetic force evaluation value $p_e$ and the torque coefficient are substituted into a mark-to-space ratio calculation formula to calculate the mark-to-space ratio for optimization.

Compared with the prior art, the present invention has the following beneficial effects.

(1) The present invention relates to a novel MC-DTC mark-to-space optimization policy for torque quantification control. A novel MC-DTC mark-to-space ratio optimization policy for torque quantification control is proposed on the basis of the MC voltage vector switching table provided by the present invention. Compared with the conventional MC-DTC policy, the method provided by the present invention may effectively inhibit torque ripples of a PMSM speed control system and acquire a constant switching frequency.

(2) In the present invention, by combining the PMSM torque and flux equations with MC voltage vectors, an analytic expression between the voltage vectors and the rates of change in torque and flux is deduced. By discretization and averaging, an MC voltage vector switching table visually displaying the degrees of change in torque and flux is established. Due to the use of the MC voltage vector switching table in the present invention, when compared with other improved MC-DTC policies, the method provided by the present invention has advantages of simple algorithm, independence from motor parameters, and no need for rotational coordinate transformation.

BRIEF DESCRIPTION OF THE DRAWINGS

FIG. 9($a$) and FIG. 9($b$) are waveform diagrams of a conventional control method and the control method provided by the present invention by comparative experiments at a motor rotating speed of 30 r/min and a load torque of 150 Nm, where FIG. 9($a$) shows waveforms of an electromagnetic torque and a stator A phase current of a motor under the conventional control method, and FIG. 9($b$) shows waveforms of an electromagnetic torque and a stator A phase current of a motor under the control method provided by the present invention;

FIG. 10($a$) and FIG. 10($b$) are waveform diagrams of the conventional control method and the control method provided by the present invention by comparative experiments at a motor rotating speed of 30 r/min and when the motor is abruptly loaded to 150 Nm from no-load (about 30 Nm), where FIG. 10($a$) shows waveforms of a rotating speed, an electromagnetic torque and an A phase winding current of a motor under the conventional control method, and FIG. 10($b$) shows waveforms of a rotating speed, an electromagnetic torque and an A phase winding current of a motor under the control method provided by the present invention; and FIG. 11($a$) and FIG. 11($b$) are waveform diagrams of the conventional control method and the control method provided by the present invention by comparative experiments when the rotating speed of a motor is jumped to 30 r/min from 20 r/min in a no-load state, where FIG. 11($a$) shows waveforms of a rotating speed, an electromagnetic torque and a stator flux $\alpha$-$\beta$ components of a motor under the conventional control method, and FIG. 11($b$) shows waveforms of a rotating speed, an electromagnetic torque and a stator flux $\alpha$-$\beta$ components of a motor under the control method provided by the present invention.

DETAILED DESCRIPTION OF THE INVENTION

The present invention will be further described as below in details with reference to the specific embodiments.

The present invention provides a direct torque control method for inhibiting torque ripples, mainly including the following steps: establishing an MC voltage vector switching table visually displaying degrees of change in torque and flux, then inquiring a torque evaluation value $\rho_\tau$ of an MC voltage vector from the MC voltage vector switching table visually displaying degrees of change in torque and flux, and finally optimization calculating the mark-to-space ratio of the voltage vector.

The specific steps will be described as below.

Step 1: An MC voltage vector switching table visually displaying degrees of change in torque and flux is established.

Figure 1:
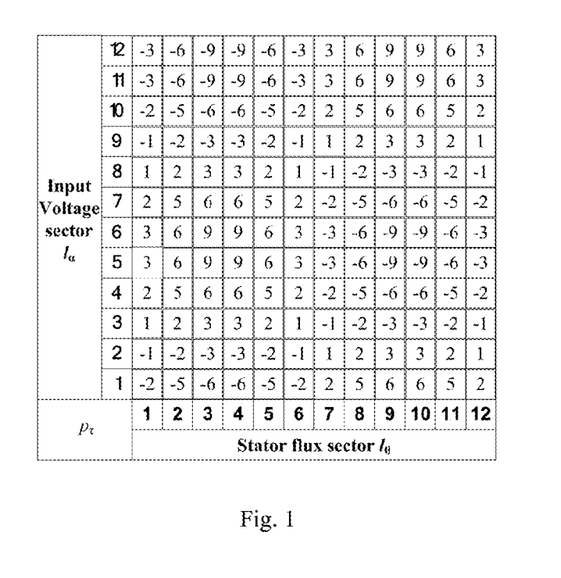
FIG. 1 is a $p_\tau$ value table showing the effect of a vector $V_{+1}$ of a matrix converter to the degree of change in torque according to the present invention.
Figure 2:
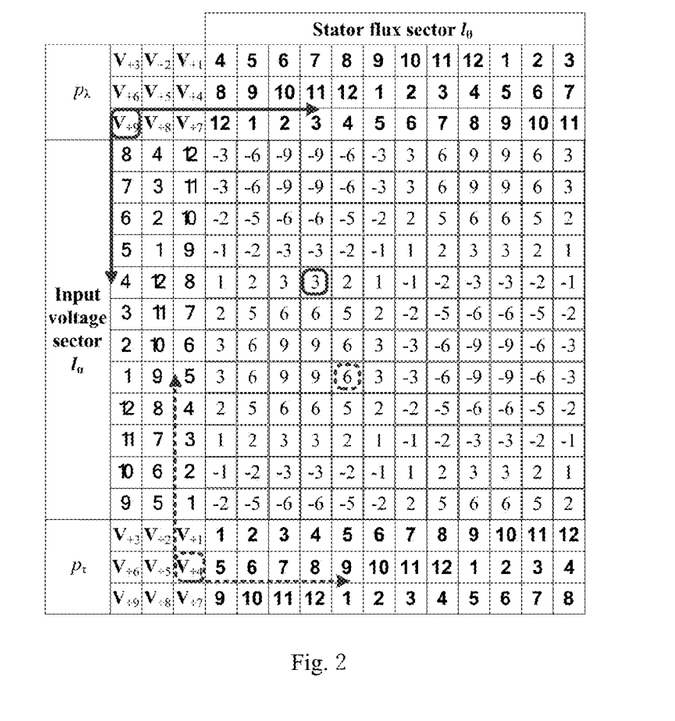
FIG. 2 is an established MC voltage vector switching table visually displaying the degrees of change in torque and flux according to the present invention.

A spatially rotational coordinate system x-y is established and a stator flux $\psi_s$ is positioned on the x-axis, with a relationship between the torque and stator flux amplitude of a permanent magnet synchronous motor and a stator voltage as follows:

$$\frac{d}{dt}|\Psi_s| = v_x \quad (1)$$

$$\frac{d}{dt}T_e \propto v_y - \omega_r|\Psi_s| \quad (2)$$

in formulae (1) and (2), $v_x$ and $v_y$ denote components of the stator voltage on the x-axis and the y-axis, $\omega_r$ denotes an electrical angular speed of a rotor; $|\Psi_s|$ denotes the stator flux amplitude, $T_e$ denotes the electromagnetic torque, and t denotes the time;

a voltage vector $V_{+1}$ of a+1 switching combination is decomposed on the x-y coordinates to obtain:

$$V_{+1y}=2/3v_{ab}\sin(-\theta_s)=-2/\sqrt{3}V_m\cos(\alpha_i+\pi/6)\sin\theta_s \quad (3)$$

$$V_{+1x}=2/3v_{ab}\cos(-\theta_s)=2/\sqrt{3}V_m\cos(\alpha_i+\pi/6)\cos\theta_s \quad (4)$$

in formulae (3) and (4), $V_{+1x}$ denotes a projection of $V_{+1}$ on the x-axis, $V_{+1y}$ denotes a projection of $V_{+1}$ on the y-axis, $V_m$ denotes the maximum value of an MC input phase voltage, $\theta_s$ denotes an included angle between the x-axis and an A phase winding of a motor, and $\alpha_i$ denotes a vector angle of the MC input phase voltage;

a torque evaluation function $\tau$, a flux evaluation function $\lambda$ and a counter electromagnetic force evaluation function e are defined as below:

$$\tau = \frac{v_y}{2/\sqrt{3}\,V_m} \quad (5)$$

$$\lambda = \frac{v_x}{2/\sqrt{3}\,V_m} \quad (6)$$

$$e = \frac{\omega_r|\Psi_s|}{2/\sqrt{3}\,V_m} \quad (7)$$

formula (3) and formula (4) are substituted into formula (5) and formula (6) respectively, to obtain torque and flux evaluation functions $\tau_{+1}$ and $\lambda_{+1}$ of the +1 switching combination:

$$\tau_{+1}=\cos(\alpha_i+\pi/6)\sin\theta_s \quad (8)$$

$$\lambda_{+1}=\cos(\alpha_i+\pi/6)\cos\theta_s \quad (9)$$

similarly, torque and flux evaluation functions of all voltage vectors of the MC are obtained;

both the torque evaluation function $\tau$ and the flux evaluation function $\lambda$ are binary periodic functions; within one of $\theta_s \in [0,2\pi]$ and $\alpha_i \in [0,2\pi]$, $\theta_s$ and $\alpha_i$ are divided into intervals every $\pi/6$ from 0 and then represented as a stator flux sector $I_\theta \in [1,12]$ and a stator voltage sector $I_\alpha \in [1,12]$, so that the whole plane is divided into 12×12 regions;

the average value of each of the regions is used to represent the value of the torque evaluation function $\tau$ and the value of the flux evaluation function $\lambda$ of this region, and thus functions for calculating the average value of the torque evaluation function $\tau$ and the average value of the flux evaluation function $\lambda$ are defined as:

$$p_\tau = \mathrm{round}\left[\frac{k}{(\pi/6)^2}\int_{\frac{\pi}{6}(I_\alpha-1)}^{\frac{\pi}{6}I_\alpha}\int_{\frac{\pi}{6}(I_\theta-1)}^{\frac{\pi}{6}I_\theta}\tau\,d\theta_s\,d\alpha_i\right] \quad (10)$$

$$p_\lambda = \mathrm{round}\left[\frac{k}{(\pi/6)^2}\int_{\frac{\pi}{6}(I_\alpha-1)}^{\frac{\pi}{6}I_\alpha}\int_{\frac{\pi}{6}(I_\theta-1)}^{\frac{\pi}{6}I_\theta}\lambda\,d\theta_s\,d\alpha_i\right] \quad (11)$$

in formulae (10) and (11), $I_\alpha=\{1,2,3\ldots 12\}$, $I_\theta=\{1,2,3\ldots 12\}$; and round( ) denotes proximity rounding function, $p_\tau$ denotes a torque evaluation value, and $p_\lambda$ denotes a flux evaluation value; if k=10, the torque evaluation value $p_\tau$ and the flux evaluation value $p_\lambda$ are integers between −9 and +9;

formula (5), formula (6) and formula (7) are substituted into formula (1) and formula (2) to obtain a function relational expression between the torque evaluation function $\tau$, the flux evaluation function $\lambda$, the counter electromagnetic force evaluation function e, and a rate of change in torque and a rate of change in flux of the motor:

$$\frac{d}{dt}T_e \propto \tau - e \quad (12)$$

$$\frac{d}{dt}|\Psi_s| \propto \lambda \quad (13)$$

from formula (10), formula (11), formula (12) and formula (13), a function relational expression between the MC torque evaluation value $p_\tau$, the MC flux evaluation value $p_\lambda$ and the rate of change in torque and the rate of change in flux of the motor may be obtained:

$$\frac{d}{dt}T_e \approx \overline{\frac{d}{dt}T_e} \propto p_\tau - p_e \quad (14)$$

$$\frac{d}{dt}|\Psi_s| \approx \overline{\frac{d}{dt}|\Psi_s|} \propto p_\lambda \quad (15)$$

in formulae (14) and (15), the left part of symbol $\propto$ denotes an average value of the rate of change in torque and the rate of change in flux of the motor within a region, wherein the average value of the counter electromagnetic force evaluation function is:

$$p_e=\mathrm{round}(10e) \quad (16)$$

it can be seen from formula (14) and formula (15) that the torque evaluation value $p_\tau$ and flux evaluation value $p_\lambda$ after discretization and averaging are approximately in direct proportion to the rates of change in torque and flux of the motor;

the $p_\tau$ values of the vector $V_{+1}$ within all regions may be calculated by substituting formula (8) into formula (10), these values are gathered in form of a table to obtain a switching table showing the effect of the vector $V_{+1}$ to the change in torque, as shown in FIG. 1, where a horizontal header of the switching table showing the effect of the vector $V_{+1}$ to the change in torque is a stator flux sector $I_\theta$ while a vertical header thereof is a stator voltage sector $I_\alpha$;

the torque evaluation function $\tau$ and the flux evaluation function $\lambda$ are products of the two functions, wherein the term containing $\alpha_i$ is related to time and called herein as a temporal expression, and the term containing $\theta_s$ is related to the stator flux and the spatial position of the voltage vector and called herein as a spatial expression;

the torque evaluation functions $\tau$ and flux evaluation functions $\lambda$ of 18 effective vectors of the MC have the following situations:

situation 1: τ and λ of a same vector have a same temporal expression, and the spatial expression of λ is π/2 lagged behind the spatial expression of τ;

situation 2: $\tau_{+1}, \tau_{+2}$ and $\tau_{+3}$ have a same spatial expression, but each has a temporal expression 2π/3 lagged behind another in this order;

situation 3: $\tau_{+1}, \tau_{+4}$ and $\tau_{+7}$ have a same temporal expression, but each has a spatial expression 2π/3 lagged behind another in this order;

$\tau_{+2}, \tau_{+5}$ and $\tau_{+8}$ have a same temporal expression, but each has a spatial expression 2π/3 lagged behind another in this order; and $\tau_{+3}, \tau_{+6}$ and $\tau_{+9}$ have a same temporal expression, but each has a spatial expression 2π/3 lagged behind another in this order; and situation 4: the values of negative vectors $\tau_{-1}, \tau_{-2}$ to $\tau_{-9}$, $\lambda_{-1}, \lambda_{-2}$ to $\lambda_{-9}$ are negative numbers of the values of corresponding positive vectors $\tau_{+1}, \tau_{+2}$ to $\tau_{+9}, \lambda_{+1}, \lambda_{+2}$ to $\lambda_{+9}$;

according to situation 2 and situation 3, the vertical header, i.e., the stator voltage sector, and the horizontal header, i.e., the stator flux sector, of the switching table (as shown in FIG. 1) showing the effect of the vector $V_{+1}$ to the change in torque may be translated to obtain a switching table showing the effect of all positive vectors of the MC to the change in torque; then, according to situation 1, the horizontal header, i.e., the stator flux sector, of the switching table showing the effect of the vector $V_{+1}$ to the change in torque may be translated to obtain a switching table showing the effect of all positive vectors of the MC to the change in flux; finally, according to situation 4, $p_\tau$ and $p_\lambda$ values corresponding to all negative vectors of the MC are calculated; and after translating the vertical header, i.e., the stator voltage sector, and the horizontal header, i.e., the stator flux sector, an MC voltage vector switching table visually displaying degrees of change in torque and flux is formed, as shown in FIG. 2. As shown, a left header region is an input voltage sector, an upper header region is a stator flux sector for inquiring $p_\lambda$ and a lower header region is a stator flux sector for inquiring $p_\tau$. A table lookup method will be illustrated as follow. If it is required to inquire the $p_\tau$ value of a vector $V_{+4}$ within a region of $I_\theta$=9 and $I_\alpha$=5, as shown by the dotted arrow in FIG. 2, the vector $V_{+4}$ is selected in the lower header region first and then 9 is selected in a corresponding row and 5 in a corresponding column, so that the inquiry result shows that $p_\tau$=6; if it is required to inquire the $p_\lambda$ value of a vector $V_{-9}$ within a region of $I_\theta$=3 and $I_\alpha$=4, as shown by the solid arrow in FIG. 2, the vector $V_{+9}$ is selected in the upper header region to obtain an inquiry result of $p_\lambda$ =3, and then a negation operation is performed to a final result of $p_\lambda$ =−3.

Step 2: The degrees of change in PMSM torque and flux of all effective vectors of the MC may be inquired from the established MC voltage vector switching table in the present invention, and then the mark-to-space ratio is calculated for optimization, including the following steps:

First step: A matrix converter voltage vector is selected by a conventional MC-DTC control method. According to an average value of a sine function of a motor electromagnetic torque, a motor stator flux and an input power factor angle on the grid side, a matrix converter voltage vector is selected from the switching table by the conventional MC-DTC control method.

Second step: A sector of a stator flux vector is calculated. A rotating path of the stator flux vector is divided into sectors every π/6 from 0 as a starting angle, so that the whole plane is divided into 12 sectors. According to the phase angle of the stator flux vector, the number of the sector of the stator flux vector may be obtained.

Third step: A sector of an input voltage vector is calculated. A rotating path of the input voltage vector is divided into sectors every π/6 from 0 as a starting angle, so that the whole plane is divided into 12 sectors. According to the phase angle of the input voltage vector, the number of the sector of the input voltage vector may be obtained.

Fourth step: An MC vector electromagnetic torque evaluation value is inquired. According to the MC voltage vector obtained in the first step, the number of the sector of the stator flux vector obtained in the second step and the number of the sector of the input voltage sector obtained in the third step, the MC vector electromagnetic torque evaluation value is inquired from the MC voltage vector switching table established in step 1.

Fifth step: A counter electromagnetic force evaluation value is calculated. The rotating speed of the motor is sampled, and then the counter electromagnetic force evaluation value is calculated according to the rotating speed and the counter electromagnetic force evaluation function.

Sixth step: A torque coefficient is set offline. The torque coefficient is set offline according to the control requirements, where the torque coefficient is a positive real number. A large torque coefficient may inhibit torque ripples in a stable state, but slow torque response speed results in poor system transient performance. The torque coefficient is not required to set in real time online as long as it is set offline one time.

Seventh step: The mark-to-space of the voltage vector is calculated for optimization. Differences between the calculated electromagnetic torque value and the reference values, i.e., the electromagnetic torque evaluation value obtained in the sixth step, the counter electromagnetic force evaluation value obtained in the seventh step and the torque coefficient obtained in the eighth step, are substituted into a mark-to-space ratio calculation formula to calculate the mark-to-space ratio for optimization.

Embodiments

The present invention is applicable to a matrix converter-fed permanent magnet synchronous motor speed control system and employs a novel MC-DTC mark-to-space ratio optimization method for torque quantification control.

Figure 3:
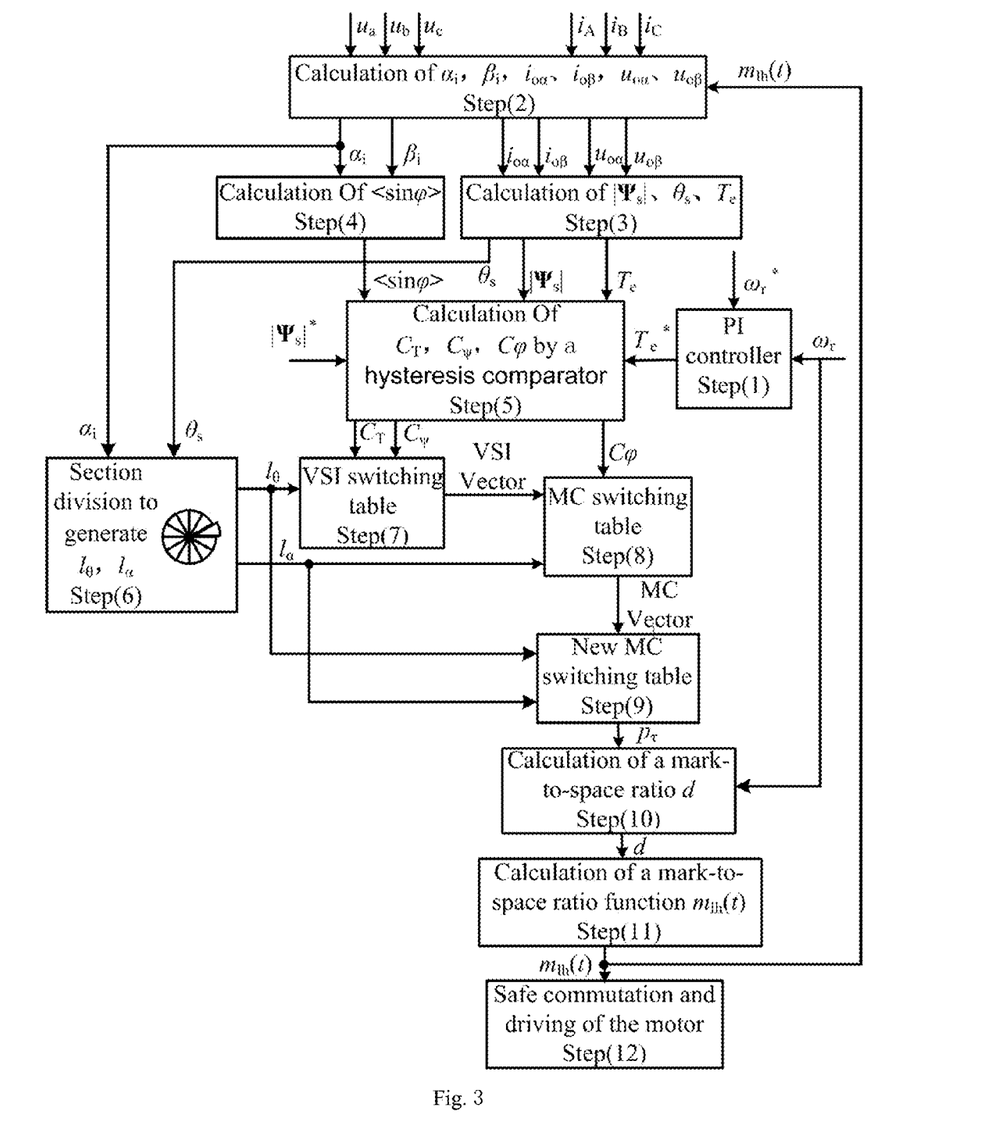
FIG. 3 is a flowchart of a direct torque control method for inhibiting torque ripples according to the present invention.

The present invention will be further described as below with reference to specific embodiments and drawings. FIG. 3 is a flowchart of the implementation of the present invention. The implementation method provided by the present invention includes the following steps:

(1) detecting rotating speed $\omega_r$ of a motor, setting a speed reference value $\omega_r^*$, and acquiring an electromagnetic torque reference value by a proportional-integral controller.

(2) Calculating a phase angle $\alpha_i$ of an input phase voltage, components $i_{o\alpha}$ and $i_{o\mu}$ of an output current in a two-phase static coordinate system, components $u_{o\alpha}$ and $u_{o\beta}$ of an output phase voltage in the two-phase static coordinate system and a phase angle $\beta_i$ of an input current.

(2.1) Calculating the phase angle $\alpha_i$ of the input phase voltage, detecting three phases of phase voltage $u_a$, $u_b$ and $u_c$ on the MC input side and then transforming into components $u_{i\alpha}$ and $u_{i\beta}$ in the two-phase static coordinate system, and calculating $\alpha_i$ through $u_{i\alpha}$ and $u_{i\beta}$ by the following formula:

$$\begin{pmatrix} u_{i\alpha} \\ u_{i\beta} \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} u_a \\ u_b \\ u_c \end{pmatrix}$$

$$\alpha_i = \arctan\left(\frac{u_{i\beta}}{u_{i\alpha}}\right)$$

wherein, arctan( ) denotes an arc tangent trigonometric transformation function.

(2.2) Calculating components $i_{o\alpha}$ and $i_{o\beta}$ of the output current in the two-phase static coordinate system, detecting three phase of current $i_A$, $i_B$ and $i_C$ on the MC output side and then transforming into components $i_{o\alpha}$ and $i_{o\beta}$ in the two-phase static coordinate system by the following formula:

$$\begin{pmatrix} i_{o\alpha} \\ i_{o\beta} \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_A \\ i_B \\ i_C \end{pmatrix}$$

Figure 4:
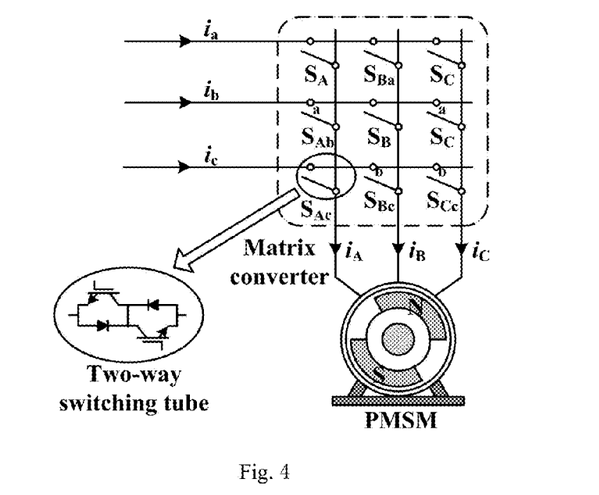
FIG. 4 is a structural diagram of a matrix converter according to the present invention.

(2.3) Calculating components $u_{o\alpha}$ and $u_{o\beta}$ of the output phase voltage in the two-phase static coordinate system, detecting three phases of phase voltage $u_a$, $u_b$ and $u_c$ on the MC input side, calculating and outputting three phases of voltage $u_A$, $u_B$ and $u_C$ by an MC low-frequency transmission matrix, and obtaining $u_{o\alpha}$ and $u_{o\beta}$ by three-phase/two-phase static coordinate transformation by the following formula:

$$\begin{bmatrix} u_A \\ u_B \\ u_C \end{bmatrix} = \begin{bmatrix} m_{Aa}(t) & m_{Ab}(t) & m_{Ac}(t) \\ m_{Ba}(t) & m_{Bb}(t) & m_{Bc}(t) \\ m_{Ca}(t) & m_{Cb}(t) & m_{Cc}(t) \end{bmatrix} \begin{bmatrix} u_a \\ u_b \\ u_c \end{bmatrix}$$

wherein, $m_{Ih}(t)$ denotes a mark-to-space ratio function of an MC switching tube $S_{Ih}$ as shown in FIG. 4, $0 \leq m_{Ih}(t) \leq 1$, $I \in \{A,B,C\}$, and $h \in \{a,b,c\}$ ○:

$$\begin{pmatrix} u_{o\alpha} \\ u_{o\beta} \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} u_A \\ u_B \\ u_C \end{pmatrix}$$

(2.4) Inputting the phase angle $\beta_i$ of current, detecting three phases of current $i_A$, $i_B$ and $i_C$ on the MC output side, then calculating and outputting three phases of input current $i_a$, $i_b$ and $i_c$ by the MC low-frequency transmission matrix and transforming into components $i_{i\alpha}$ and $i_{i\beta}$ in the two-phase static coordinate system, and calculating $\beta_i$ through $i_{i\alpha}$ and $i_{i\beta}$ by the following formula:

$$\begin{bmatrix} i_a \\ i_b \\ i_c \end{bmatrix} = \begin{bmatrix} m_{Aa}(t) & m_{Ba}(t) & m_{Ca}(t) \\ m_{Ab}(t) & m_{Bb}(t) & m_{Cb}(t) \\ m_{Ac}(t) & m_{Bc}(t) & m_{Cc}(t) \end{bmatrix} \begin{bmatrix} i_A \\ i_B \\ i_C \end{bmatrix}$$

wherein, $m_{Ih}(t)$ denotes a mark-to-space ratio function of an MC switching tube $S_{Ih}$ as shown in FIG. 4, $0 \leq m_{Ih}(t) \leq 1$, $I \in \{A,B,C\}$, and $h \in \{a,b,c\}$:

$$\begin{pmatrix} i_{i\alpha} \\ i_{i\beta} \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_a \\ i_b \\ i_c \end{pmatrix}$$

$$\beta_i = \arctan\left(\frac{i_{i\beta}}{i_{i\alpha}}\right);$$

(3) calculating a stator flux amplitude $|\psi_s|$, a phase angle $\theta_s$ and an electromagnetic torque $T_e$.

(3.1) Calculating two-phase static coordinate components $\psi_\alpha$ and $\psi_\beta$ of the stator flux by the following formulae:

$$\psi_\alpha = \int(u_{o\alpha} - i_{o\alpha} R_s) dt + \psi_f \cos\theta_r$$

$$\psi_\beta = \int(u_{o\beta} - i_{o\beta} R_s) dt + \psi_f \cos\theta_r$$

wherein, $\psi_f$ denotes a permanent magnet flux, $\theta_r$ denotes an included angle between the permanent magnet flux and an A phase winding of a motor, and $R_s$ denotes a stator resistance.

(3.2) Calculating the stator flux amplitude $|\psi_s|$ and the phase angle $\theta_s$ by the following formulae:

$$|\Psi_s| = \sqrt{\psi_\alpha^2 + \psi_\beta^2}$$

$$\theta_s = \arctan\left(\frac{\psi_\beta}{\psi_\alpha}\right).$$

(3.2) Calculating the electromagnetic torque $T_e$ by the following formula:

$$T_e = 1.5p(\psi_\alpha i_{o\beta} - \psi_\beta i_{o\alpha})$$

wherein, $p$ denotes the number of pole pairs of the motor.

(4) Calculating the average value of a sine function of an input power factor angle, wherein, $\phi = \alpha_i - \beta_i$. The average value is obtained by a low-pass filter, and the transfer function of the low-pass filter is as follows:

$$\frac{1}{\rho s + 1}$$

wherein, $\rho$ denotes a time constant generally between $10^{-4}$ and $10^{-3}$, and s denotes a differential operator.

Figure 5:
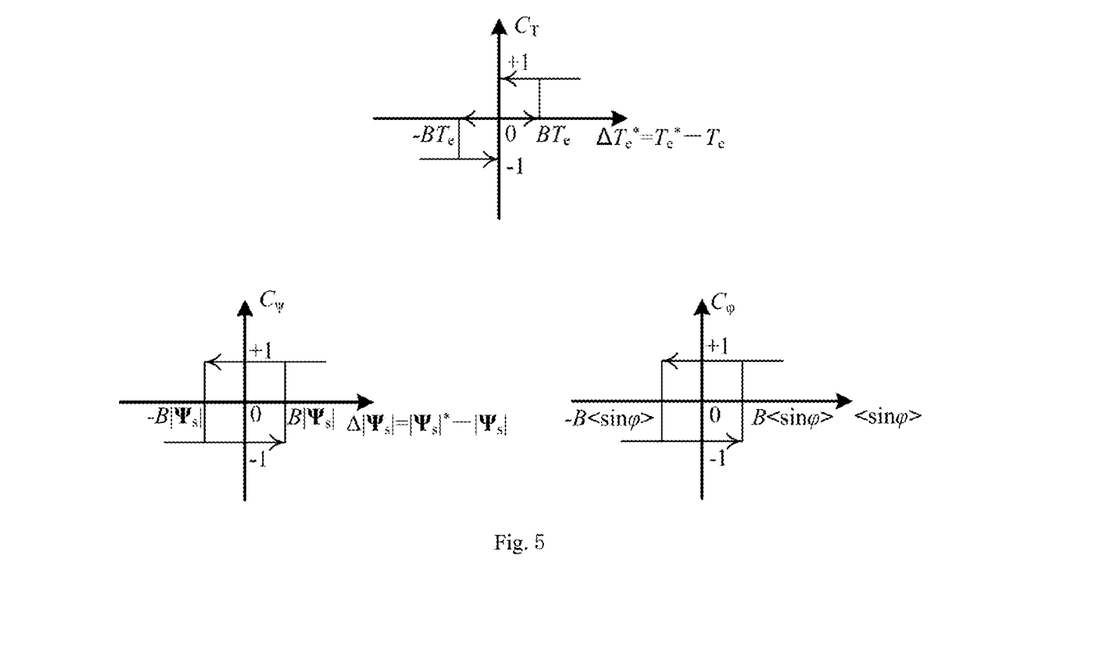
FIG. 5 shows a torque, flux and input power factor hysteresis comparator according to the present invention.

(5) Obtaining a torque switching function $C_\tau$, a flux switching function $C_\psi$, and an input power factor switching function $C_\phi$, by a hysteresis comparator. The torque, flux and input power factor hysteresis comparator is as shown in FIG. 5. As shown, $BT_e$, $B|\psi_s|$ and $B<\sin\phi>$ denote the loop widths of the torque, flux and input power factor respectively. Generally, $BT_e$ is 0.5% to 5% times of a rated torque, $B|\psi_s|$ is 0.1% to 2% times of the permanent magnet flux, and $B<\sin\phi>$ is 0. As shown, $T_e^*$ and $|\psi_s|^*$ are an electromagnetic torque reference value and a stator flux amplitude reference value respectively.

(6) Dividing the stator flux and the input voltage into sectors, where the number of the sector of the stator flux is $I_\theta$ and the number of the sector of the input voltage is $I_\alpha$. The whole plane is divided into 12 sectors every $\pi/6$ from 0. The number of a sector is determined according to the phase angle $\theta_s$ of the stator flux and the phase angle $\alpha_i$ of the input voltage.

Figure 6:
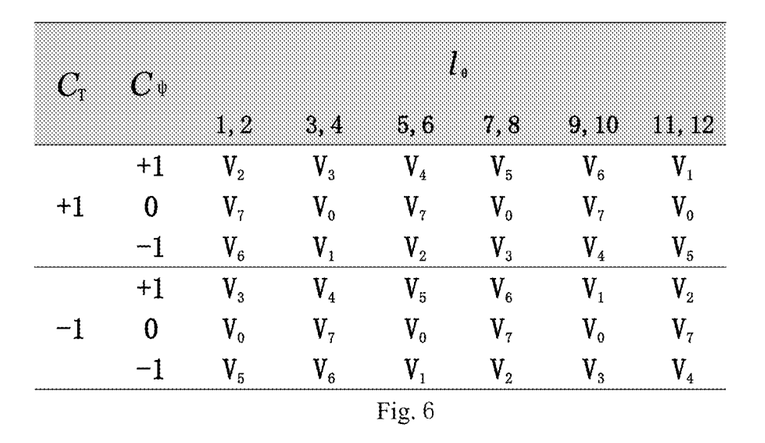
FIG. 6 shows a switching table for acquiring a virtual VSI vector.

(7) Obtaining a virtual VSI vector by inquiring the switching table. According to the torque switching function $C_\tau$, the flux switching function $C_\psi$, and the number $I_\theta$ of the sector of the stator flux, the virtual VSI vector is inquired from the switching table, where the switching table is as shown in FIG. 6.

Figure 7:
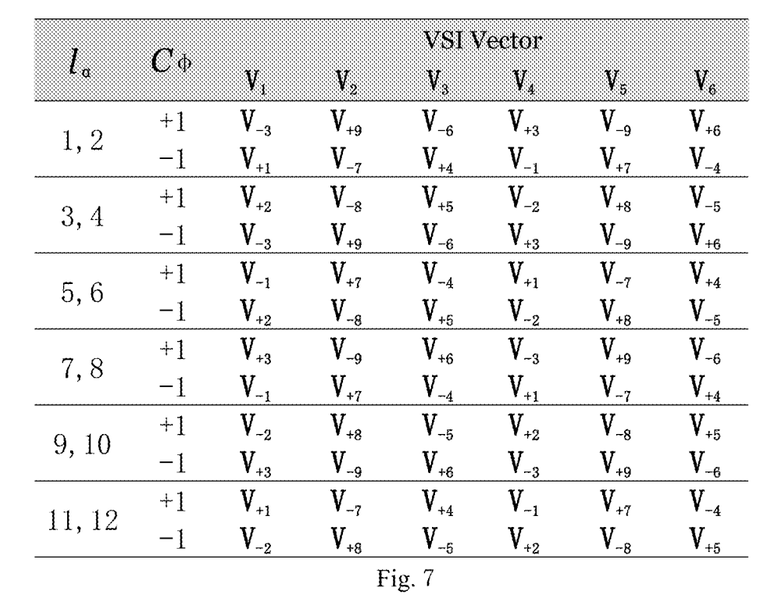
FIG. 7 shows an MC voltage vector switching table.

(8) Obtaining an MC vector by inquiring the MC voltage vector switching table. According to the virtual VSI vector, the input power factor switching function $C_\varphi$ and the number $I_\alpha$ of the sector of the input voltage, inquiring the MC vector from the MC voltage vector switching table, where the MC voltage vector switching table is as shown in FIG. 7.

(9) Obtaining a torque evaluation value $p_\tau$ by inquiring the MC voltage vector switching table provided by the present invention. According to the MC vector, the number $I_\theta$ of the sector of the stator flux and the number $I_\alpha$ of the sector of the input voltage, the torque evaluation value $p_\tau$ is inquired from the MC voltage vector switching table provided by the present invention, where the MC voltage vector switching table provided by the present invention is as shown in FIG. 2.

(10) Calculating a mark-to-space ratio to obtain the mark-to-space ratio d.

(10.1) Detecting the rotating speed of a motor, and calculating a counter electromagnetic force evaluation value $p_e$ by the following formula:

$$p_e = \text{round}(e) = \text{round}\left(\frac{\omega_r |\Psi_s|}{2/\sqrt{3}\, V_m}\right),$$

wherein, $\omega_r$ denotes an electric angular speed of a motor rotator, $V_m$ denotes the maximum value of an MC input phase voltage (generally a phase voltage amplitude of the power grid), and round( ) denotes a proximity rounding function.

(10.2) Setting the torque coefficient $K_\tau$. The setting of $K_\tau$ needs to comprehensively consider the dynamic response and steady-state performance of a control system. Although a larger $K_\tau$ may better inhibit torque ripples in a steady state, slow torque response speed results in poor transient performance. The value of $K_\tau$ may be selected from an intersection of the following two inequalities:

$$\frac{1.2 T_N}{K_T p_\tau} \geq 0.85 \quad 0.1 p_e \leq \frac{|BT_e|}{K_T} \leq 0.5 p_e$$

wherein, $T_N$ denotes a rated torque of the motor. Generally, $p_\tau$ is an integer within [7,9] and $p_e$ is an integer within [1,4].

(10.3) Calculating a mark-to-space ratio by the following formula:

$$d = \frac{T_e^* - T_e}{K_T p_\tau} + \frac{p_e}{p_\tau}.$$

(10.4) Performing amplitude limiting to the mark-to-space ratio. As the mark-to-space ratio d can only be between [0,1], the d is subjected to amplitude limiting. If d>1, d=1; and, if d<0, d=0.

(11) Determining a mark-to-space ratio function $m_{jh}(t)$ of each switching tube according to the mark-to-space ratio d and the MC vector.

(12) Controlling the on or off of 9 two-way switching tubes of the MC by a commutation control circuit, thereby realizing the safe commutation and driving the motor system for the speed control.

Figure 8:
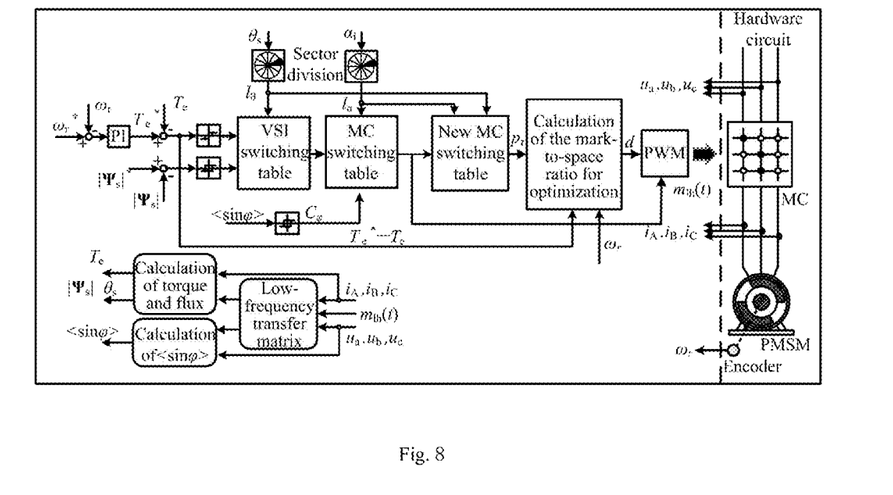
FIG. 8 shows a diagram of implementation of the direct torque control method for inhibiting torque ripples according to the present invention.

The implementation of the direct torque control method for a matrix converter provided by the present invention is as shown in FIG. 8, wherein, steps (1) to (11) are implemented by a floating-point microprocessor TMS320F28335, and step (12) is implemented by an FPGA chip EP1C6. The commutation control circuit program belongs to prior art.

The direct torque control method for a matrix converter provided by the present invention has been tested on a 10 kW sample machine, and it is indicated that the system has good dynamic and static performances and that torque ripples are effectively inhibited.

Figure 9:
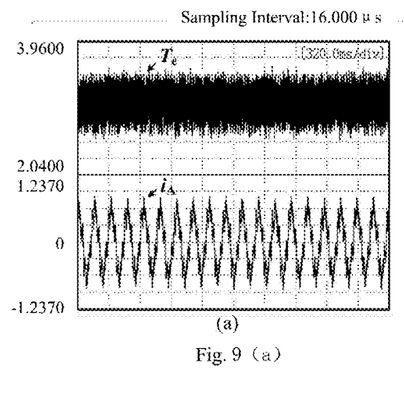

The waveform diagrams of the direct torque control method for a matrix converter provided by the present invention and the conventional direct torque control method for a matrix converter in a steady-state comparison test are as shown in FIG. 9(a) and FIG. 9(b), at a motor rotating speed of 30 r/min and a load torque of 150 Nm. The left drawing shows waveforms of an electromagnetic torque and an A phase winding current of a motor under the conventional control method, and the right drawing shows waveforms of an electromagnetic torque and an A phase winding current of a motor under the control method provided by the present invention. It can be seen from the drawings that the conventional control method has large torque ripples and a transient peak-to-peak value of 63 Nm, while the transient peak-to-peak value of the control method provided by the present invention is just 30 Nm.

Figure 10A:
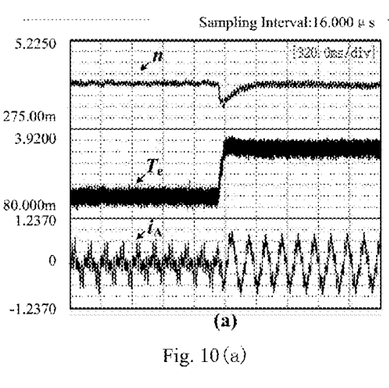
Figure 10B:
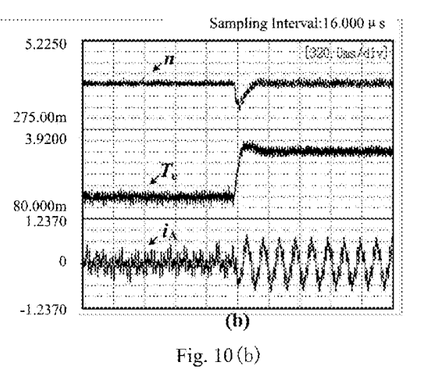
Figure 11A:
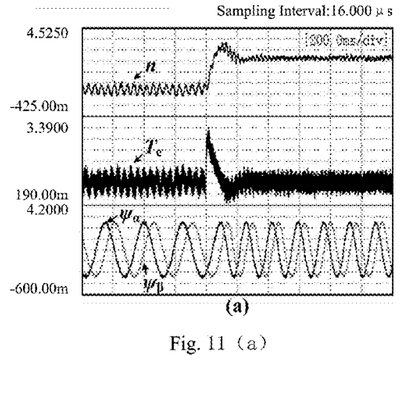
Figure 11B:
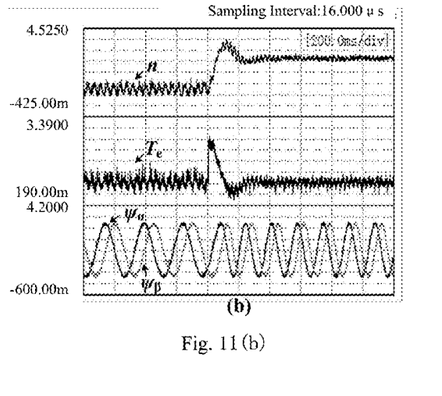

Waveform diagrams of the direct torque control method for a matrix converter provided by the present invention and the conventional direct torque control method for a matrix converter in a transient-state comparison test are as shown in FIG. 10(a), FIG. 10(b), FIG. 11(a) and FIG. 11(b). In FIG. 10(a) and FIG. 10(b), the test conditions are that the motor rotating speed is 30 r/min and the motor is abruptly loaded to 150 Nm from no-load (about 30 Nm), where the left drawing shows waveforms of a rotating speed, an electromagnetic torque and an A phase winding current of a motor under the conventional control method, and the right drawing shows waveforms of a rotating speed, an electromagnetic torque and an A phase winding current of a motor under the control method provided by the present invention. As seen, the control method provided by the present invention may realize the tracking of the motor rotating speed and torque with small torque ripples. In FIG. 11(a) and FIG. 11(b), the test condition is that the rotating speed of the motor is jumped to 30 r/min from 20 r/min in a no-load state, where the left drawing shows waveforms of a rotating speed, an electromagnetic torque and a stator flux $\alpha$-$\beta$ components of a motor under the conventional control method, and the right drawing shows waveforms of a rotating speed, an electromagnetic torque and a stator flux $\alpha$-$\beta$ components of a motor under the control method provided by the present invention. As seen, the control method provided by the present invention inherits the characteristic of quick torque response of the conventional control method.

Although the present invention has been described above with reference to the accompanying drawings, the present invention is not limited to the foregoing specific implementations, and the foregoing specific implementations are merely illustrative and do not constitute any limitations. Various variations may be made by a person of ordinary skill in the art under the teaching of the present invention without departing from the spirit of the present invention, and all those variations shall be regarded as falling into the protection scope of the present invention.

The invention claimed is:

1. A direct torque control method for inhibiting torque ripples, comprising the following steps:
   step 1: establishing an MC voltage vector switching table visually displaying degrees of change in torque and flux
   a spatially rotational coordinate system x-y is established and a stator flux $\psi_s$ is positioned on the x-axis, with a relationship between the torque and stator flux amplitude of a permanent magnet synchronous motor and a stator voltage as follows:

$$\frac{d}{dt}|\Psi_s| = v_x \quad (1)$$

$$\frac{d}{dt}T_e \propto v_y - \omega_r|\Psi_s| \quad (2)$$

in formulae (1) and (2), $v_x$ and $v_y$ denote components of the stator voltage on the x-axis and the y-axis, $\omega_r$ denotes an electrical angular speed of a rotor; $|\psi_s|$ denotes the stator flux amplitude, $T_e$ denotes the electromagnetic torque, and t denotes the time;

a voltage vector $V_{+1}$ of a+1 switching combination is decomposed on the x-y coordinates to obtain:

$$V_{+1y}=2/3 v_{ab}\sin(-\theta_s)=-2/\sqrt{3}\cos(\alpha_i+\pi/6)\sin\theta_s \quad (3)$$

$$V_{+2x}=2/3 v_{ab}\cos(-\theta_s)=2/\sqrt{3}V_m\cos(\alpha_i+\pi/6)\cos\theta_s \quad (4)$$

in formulae (3) and (4), $V_{+1x}$ denotes a projection of $V_{+1}$ on the x-axis, $V_{+1y}$ denotes a projection of $V_{+1}$ on the y-axis, $V_m$ denotes the maximum value of an MC input phase voltage, $\theta_s$ denotes an included angle between the x-axis and an A phase winding of a motor, and $\alpha_i$ denotes a vector angle of the MC input phase voltage; $V_{ab}$ is the ab line voltage of MC input side;

a torque evaluation function $\tau$, a flux evaluation function $\lambda$ and a counter electromagnetic force evaluation function e are defined as below:

$$\tau = \frac{v_y}{2/\sqrt{3}\,V_m} \quad (5)$$

$$\lambda = \frac{v_x}{2/\sqrt{3}\,V_m} \quad (6)$$

$$e = \frac{\omega_r|\Psi_s|}{2/\sqrt{3}\,V_m}; \quad (7)$$

formula (3) and formula (4) are substituted into formula (5) and formula (6) respectively, to obtain torque and flux evaluation functions $\tau_{+1}$ and $\lambda_{+1}$ of the +1 switching combination:

$$\tau_{+1}=\cos(\alpha_i+\pi/6)\sin\theta_s \quad (8)$$

$$\lambda_{+1}=\cos(\alpha_i+\pi/6)\cos\theta_s \quad (9);$$

similarly, torque and flux evaluation functions of all voltage vectors of the MC are obtained;

both the torque evaluation function $\tau$ and the flux evaluation function $\lambda$ are binary periodic functions; within one of $\theta_s \in [0,2\pi]$ and $\alpha_i \in [0,2\pi]$, $\theta_s$ and $\alpha_i$ are divided into intervals every $\pi/6$ from 0 and then represented as a stator flux sector $I_\theta \in [1,12]$ and a stator voltage sector $I_\alpha \in [1,12]$, so that the whole plane is divided into 12×12 regions;

the average value of each of the regions is used to represent the value of the torque evaluation function $\tau$ and the value of the flux evaluation function $\lambda$ of this region, and thus functions for calculating the average value of the torque evaluation function $\tau$ and the average value of the flux evaluation function $\lambda$ are defined as:

$$p_\tau = \text{round}\left[\frac{k}{(\pi/6)^2}\int_{\frac{\pi}{6}(I_\alpha-1)}^{\frac{\pi}{6}I_\alpha}\int_{\frac{\pi}{6}(I_\theta-1)}^{\frac{\pi}{6}I_\theta}\tau\,d\theta_s\,d\alpha_i\right] \quad (10)$$

$$p_\lambda = \text{round}\left[\frac{k}{(\pi/6)^2}\int_{\frac{\pi}{6}(I_\alpha-1)}^{\frac{\pi}{6}I_\alpha}\int_{\frac{\pi}{6}(I_\theta-1)}^{\frac{\pi}{6}I_\theta}\lambda\,d\theta_s\,d\alpha_i\right] \quad (11)$$

in formulae (10) and (11), $I_\alpha = \{1,2,3\ldots 12\}$, $I_\theta = \{1,2,3 \ldots 12\}$; and round( ) denotes proximity rounding function, $p_\tau$ denotes a torque evaluation value, and $p_\lambda$ denotes a flux evaluation value; if k=10, the torque evaluation value $p_\tau$ and the flux evaluation value $p_\lambda$ are integers between −9 and +9;

formula (5), formula (6) and formula (7) are substituted into formula (1) and formula (2) to obtain a function relational expression between the torque evaluation function $\tau$, the flux evaluation function $\lambda$, the counter electromagnetic force evaluation function e, and a rate of change in torque and a rate of change in flux of the motor:

$$\frac{d}{dt}T_e \propto \tau - e \quad (12)$$

$$\frac{d}{dt}|\Psi_s| \propto \lambda; \quad (13)$$

from formula (10), formula (11), formula (12) and formula (13), a function relational expression between the MC torque evaluation value $p_\tau$, the MC flux evaluation value $p_\lambda$ and the rate of change in torque and the rate of change in flux of the motor may be obtained:

$$\frac{d}{dt}T_e \approx \overline{\frac{d}{dt}T_e} \propto p_\tau - p_e \quad (14)$$

$$\frac{d}{dt}|\Psi_s| \approx \overline{\frac{d}{dt}|\Psi_s|} \propto p_\lambda \quad (15)$$

in formulae (14) and (15), the left part of symbol $\propto$ denotes an average value of the rate of change in torque and the rate of change in flux of the motor within a region, wherein the average value of the counter electromagnetic force evaluation function is:

$$p_e = \text{round}(10e) \quad (16);$$

it can be seen from formula (14) and formula (15) that the torque evaluation value $p_\tau$ and flux evaluation value $p_\lambda$ after discretization and averaging are approximately in direct proportion to the rates of change in torque and flux of the motor;

the $p_\tau$ values of the vector $V_{+1}$ within all regions may be calculated by substituting formula (8) into formula (10), these values are gathered in form of a table to obtain a switching table showing the effect of the vector $V_{+1}$ to the change in torque, where a horizontal header of the switching table showing the effect of the vector $V_{+1}$ to the change in torque is a stator flux sector while a vertical header thereof is a stator voltage sector;

the torque evaluation function $\tau$ and the flux evaluation function $\lambda$ are products of the two functions, wherein the term containing $\alpha_i$ is related to time and called herein as a temporal expression, and the term containing $\theta_s$ is related to the stator flux and the spatial position of the voltage vector and called herein as a spatial expression;

the torque evaluation functions τ and flux evaluation functions λ of 18 effective vectors of the MC have the following situations:

situation 1: τ and λ of a same vector have a same temporal expression, and the spatial expression of λ is π/2 lagged behind the spatial expression of τ;

situation 2: $\tau_{+1}, \tau_{+2}$ and $\tau_{+3}$ have a same spatial expression, but each has a temporal expression 2π/3 lagged behind another in this order;

situation 3: $\tau_{+1}, \tau_{+4}$ and $\tau_{+7}$ have a same temporal expression, but each has a spatial expression 2π/3 lagged behind another in this order; and $\tau_{+2}, \tau_{+5}$ and $\tau_{+8}$ have a same temporal expression, but each has a spatial expression 2π/3 lagged behind another in this order; and $\tau_{+3}, \tau_{+6}$ and $\tau_{+9}$ have a same temporal expression, but each has a spatial expression 2π/3 lagged behind another in this order;

situation 4: the values of negative vectors $\tau_{-1}, \tau_{-2}$ to $\tau_{-9}$, $\lambda_{-1}, \lambda_{-2}$ to $\lambda_{-9}$ are negative numbers of the values of corresponding positive vectors $\tau_{+1}, \tau_{+2}$ to $\tau_{+9}, \lambda_{+1}, \lambda_{+2}$ to $\lambda_{+9}$;

In the situation 1-4, τ+1 to τ+9 and λ+1 to λ+9 respectively represent torque and flux evaluation functions of the +1 to +9 switching combination, τ−1 to τ−9 and λ−1 to λ−9 respectively represent torque and flux evaluation functions of the −1 to −9 switching combination;

according to situation 2 and situation 3, the vertical header, i.e., the stator voltage sector, and the horizontal header, i.e., the stator flux sector, of the switching table showing the effect of the vector $V_{+1}$ to the change in torque may be translated to obtain a switching table showing the effect of all positive vectors of the MC to the change in torque; then, according to situation 1, the horizontal header, i.e., the stator flux sector, of the switching table showing the effect of the vector $V_{+1}$ to the change in torque may be translated to obtain a switching table showing the effect of all positive vectors of the MC to the change in flux; finally, according to situation 4, $p_\tau$ and $p_\lambda$ values corresponding to all negative vectors of the MC are calculated; and after translating the vertical header, i.e., the stator voltage sector, and the horizontal header, i.e., the stator flux sector, an MC voltage vector switching table visually displaying degrees of change in torque and flux is formed; and step 2: inquiring the torque evaluation value $p_\tau$ from the MC voltage vector switching table visually displaying degrees of change in torque and flux, and optimization calculating the mark-to-space ratio of the voltage vector according to a conventional MC-DTC control method, a voltage vector of a matrix converter is selected from the MC voltage vector switching table; the number of a sector of the stator flux vector is calculated; the number of a sector of the input voltage vector is calculated; the torque evaluation value $p_\tau$ of the MC vector is obtained through the MC voltage vector switching table visually displaying degrees of change in torque and flux; a counter electromagnetic force evaluation value $p_e$ is calculated; a torque coefficient is set offline; and, the flux torque evaluation value $p_\tau$, the counter electromagnetic force evaluation value $p_e$ and the torque coefficient are substituted into a mark-to-space ratio calculation formula to calculate the mark-to-space ratio for optimization; the calculation formula of mark-to-space ratio d is as follows:

$$d = \frac{T_e^* - T_e}{K_T p_\tau} + \frac{p_e}{p_\tau} \quad (17)$$

In formulae (17), $T_e^*$ is electromagnetic torque reference value $T_e$ is electromagnetic torque and $K_\tau$ is torque coefficient.

* * * * *